UNITED STATES PATENT OFFICE.

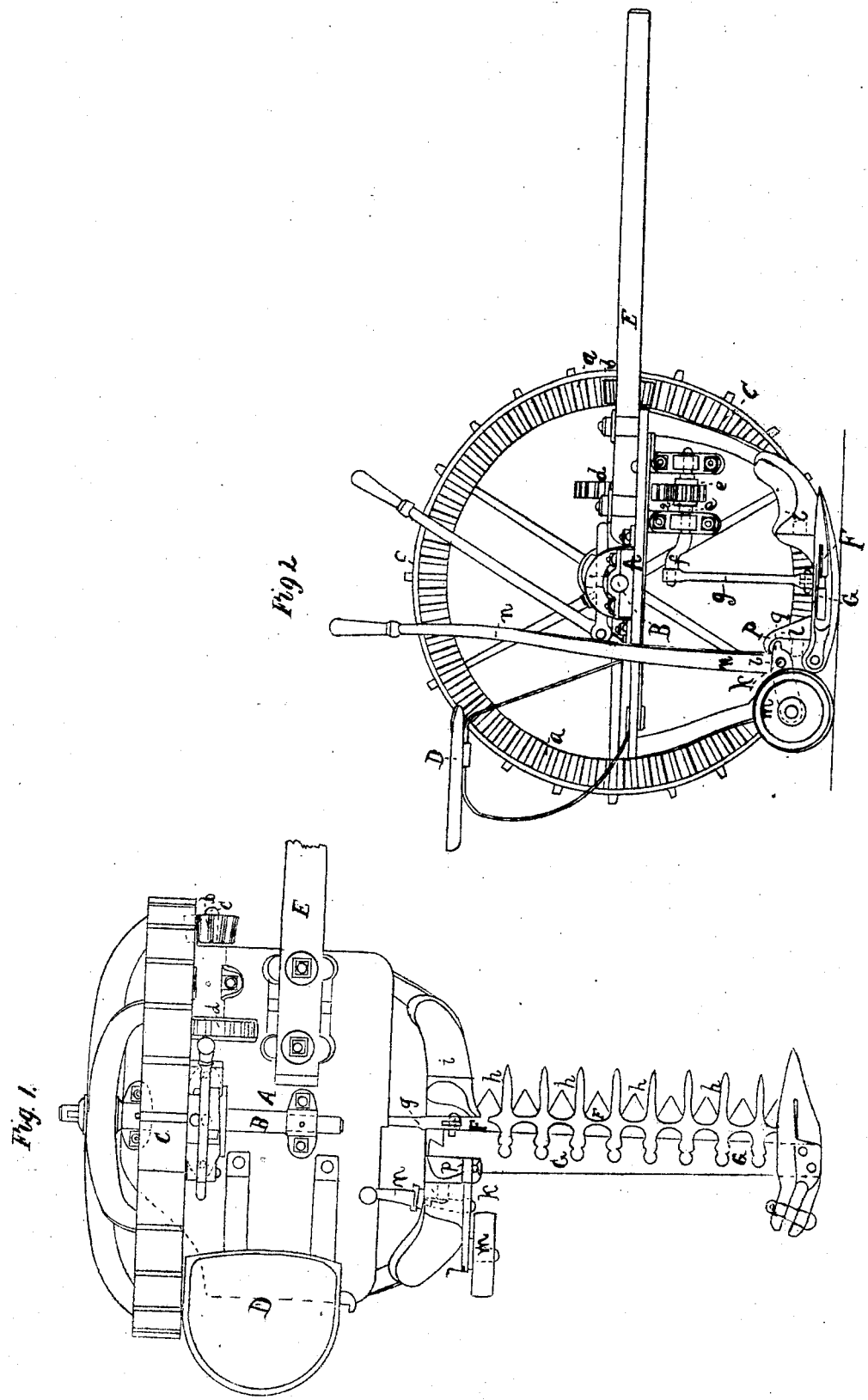

JAMES E. WOOD, OF WORCESTER, MASSACHUSETTS.

IMPROVEMENT IN MOWING-MACHINES.

Specification forming part of Letters Patent No. 37,932, dated March 17, 1863.

*To all whom it may concern:*

Be it known that I, JAMES E. WOOD, a citizen of the United States of America, and a resident of Worcester, in the county of Worcester and State of Massachusetts, have made a new and useful invention having reference to Mowing-Machines; and I do hereby declare the same to be fully described in the following specification and represented in the accompanying drawings, of which—

Figure 1 is a top view, and Fig. 2 a side elevation, of a mowing-machine furnished with my said invention, which consists in a combination of mechanism applied to the cutter stock or bar and its supporting-frame for the purpose not only of supporting the frame on the ground, but of imparting, as occasion may require, a duplex motion or movement to the cutter bar or stock, such movement causing the said cutter-bar to be raised from the ground or over an obstacle with great celerity and facility.

In the drawings, A represents the carriage-body of the frame of the machine, the same being provided with one axle, B, carrying a single driving and supporting wheel, C. The carriage-body is not only furnished with a seat, D, for a driver or attendant, but with a pole, E, for the attachment of the draft animal or animals by which the mowing-machine, when in use, is to be drawn over the surface of a field. The axle or shaft B is so made and so supported in its bearings as to be capable of being moved by suitable mechanism in longitudinal directions, so as to throw the internal gear, $a$, of the driving-wheel either into or out of engagement with a beveled pinion, $b$, fixed on another shaft, $c$, which, by means of other gears, $d\ e$, imparts rotary motion to a third shaft, $e^2$. A crank, $f$, (on the shaft $e^2$,) and a connecting-rod, $g$, serve to communicate reciprocating and rectilinear motion to the serrated knife or cutter F, which is supported in the usual manner within a cutter stock or bar, G, furnished with a series of prongs or teeth, $h\ h\ h$.

This cutter stock or bar G is hinged or connected in such manner to the curved supporter or part $i$ of the frame A as to be capable of being turned from a vertical or nearly vertical position down into or somewhat below a horizontal position. Furthermore, a short axle or shaft, $k$, is supported by and extended through the part $i$, a crank, $l$, being fixed on the outer end of the shaft. The said crank carries on its wrist a small wheel, $m$. An arm, $n$, extends up from the inner end of the shaft and into close proximity with the driver's seat. By laying hold of the arm $n$ and moving it so as to cause the wheel $m$ to be borne down upon the ground, the frame A and the cutter stock or bar, with the cutter, will be raised or tipped more or less upward and in a manner to raise the cutter-bar off the ground.

All the above-described mechanism and its arrangement and application as herein described and as exhibited in the accompanying drawings are common to some mowing-machines as now or heretofore constructed and used. I have applied to such, or to some portions thereof, certain other mechanisms for the purpose of better effecting the upward movement of the cutter-bar. This additional mechanism consists of an arm or projection, $p$, and a cam or lifter, $q$. The said arm $p$ extends from the heel part of the cutter-bar in manner as shown in Figs. 1 and 2, and directly over the cam $q$, which projects from the outer end of the cross-shaft $k$.

The arm $n$, the shaft $k$, and the crank $l$ constitute a bent lever, by which the attendant is enabled to force the wheel $n$ down upon the ground in a manner to effect the raising of the carriage and the cutter-bar, as hereinbefore mentioned. While this movement of the carriage is taking place, the cam $q$ will be borne upward against the arm $p$, and as a consequence it will still farther elevate the cutter-bar, or give to it an upward motion faster than that produced by the pressure of the wheel $m$ on the ground. Thus there will result to the cutter-bar a duplex motion or movement, highly advantageous to clearing it from any stump, stone, or other obstacle which may be met with or which may be in the way of the cutter-bar and the cutters while the machine may be in use.

I claim—

The combination of the arm $p$ and the cam $q$, or their mechanical equivalent or equivalents, with the auxiliary wheel $m$, its operative lever, and the cutter-bar G, hinged or applied to the frame A, or the supporting part $i$ thereof, substantially in manner and so as to operate as described, the said appliances to the cutter-bar and its supporter constituting what may be termed a "duplex" motion or mechanism, by the aid of which such cutter-bar may be elevated or raised off the ground and above the same with great celerity when the mowing-machine may be in use.

JAMES E. WOOD.

Witnesses:
D. W. HASKINS,
W. W. RICE,